Fig. 1

INVENTORS
Carlos R. Canalizo
John V. Fredd

INVENTORS
Carlos R. Canalizo
John V. Fredd

May 28, 1968    C. R. CANALIZO ET AL    3,385,382
METHOD AND APPARATUS FOR TRANSPORTING FLUIDS
Filed July 8, 1964    6 Sheets-Sheet 5

INVENTORS
Carlos R. Canalizo
John V. Fredd
BY
ATTORNEYS

United States Patent Office 3,385,382
Patented May 28, 1968

3,385,382
METHOD AND APPARATUS FOR
TRANSPORTING FLUIDS
Carlos R. Canalizo and John V. Fredd, Dallas, Tex., assignors to Otis Engineering Corporation, Dallas, Tex., a corporation of Delaware
Filed July 8, 1964, Ser. No. 381,159
20 Claims. (Cl. 175—205)

This invention relates to transportation apparatus and methods and more particularly to an apparatus and method for transporting fluids through a conduit or flow conductor.

An object of this invention is to provide a new and improved apparatus for transporting from one location to another by means of a conduit having a longitudinal passage such fluids or fluid materials as cement, grain, cuttings of earth formations being penetrated by a drill bit, water and the like, the term fluid as employed herein encompassing such granular or particulate materials as well as gasses and liquids.

Another object is to provide transportation apparatus having means for accelerating the movement of the fluids through the longitudinal passage of the conduit at longitudinally spaced locations along the conduit by introducing or injecting gas at high velocity into the longitudinal passage in the direction of longitudinal movement of the transported fluids therethrough to reduce the pressure therein at such locations.

Still another object is to provide a new and improved transportation apparatus wherein the gas is introduced into the longitudinal passage of the conduit through flow control devices connected to the conduit and which open when the pressure of the gas supplied thereto exceeds predetermined values, each flow control device being rendered operative to permit flow of the gas into the conduit at a higher pressure thereof than other flow control devices positioned relative thereto at locations downstream of the longitudinal flow of the transported fluids.

A further object is to provide an apparatus wherein the flow control device connected to the conduit closest to the upstream or intake end of the longitudinal passage closes the longitudinal passage when it is rendered operative and permits flow of gas into the longitudinal passage downstream of the location of closure of the longitudinal passage.

An important object of the invention is to provide a new and improved method of transporting fluids from one location to another, as from the bottom of a well bore to the surface, through a conduit whose longitudinal passage opens at its lower end to the well bore by the force of gas flowing upwardly through the conduit.

Another object is to provide a new and improved method of transporting fluids which includes the step of assisting the flow of the transported fluids at longitudinally spaced locations of the longitudinal passage by introducing gas flowing inwardly and upwardly into the longitudinal passage at high velocity to decrease the pressure in the longitudinal passage at such locations.

Still another object is to provide a new and improved method of transporting fluids which includes the step of transporting slugs or columns of liquid upwardly in the longitudinal passage by closing the longitudinal passage and introducing gas under pressure into the longitudinal passage below such column of liquids.

Another important object is to provide a new and improved method and apparatus for drilling a well bore and removing cuttings and liquids from the well bore during the drilling thereof by the circulation of gas which do not require the introduction of gas under high pressure into the well bore.

Still another object is to provide an apparatus and method for drilling a well bore and for transporting cuttings and liquid from the well bore which provides for circulation of low pressure gas into the well bore and then upwardly through a tubing extending through the well bore and for simultaneous circulation of high pressure gas from the surface through a passage means extending in the well bore into the tubing to aid in the transport of the cuttings and liquids to the surface.

Another important object is to provide a new and improved flow control device connectable in a conduit to constitute a section thereof for introducing gas at high velocity from the exterior of the device into the conduit to decrease the pressure in the conduit below the location of the entrance of the high velocity gas.

Still another object is to provide a flow control device having valve means responsive to the pressure exteriorly of the flow control device which is opened to permit flow of the gas into the conduit when the pressure exteriorly of the flow control device exceeds a predetermined value.

Still another object is to provide a flow control device which does not substantially decrease the effective orifice of the conduit.

Still another object is to provide a flow control device which also has a valve means for closing the passage of the conduit upstream of the locations of admittance of gas thereby into the conduit when the pressure exteriorly of the flow control device exceeds a predetermined value.

Additional objects and advantages of the invention will be readily apparent from the reading of the following description of a device constructed in accordance with the invention, and reference to the accompanying drawings thereof, wherein.

Figure 1:
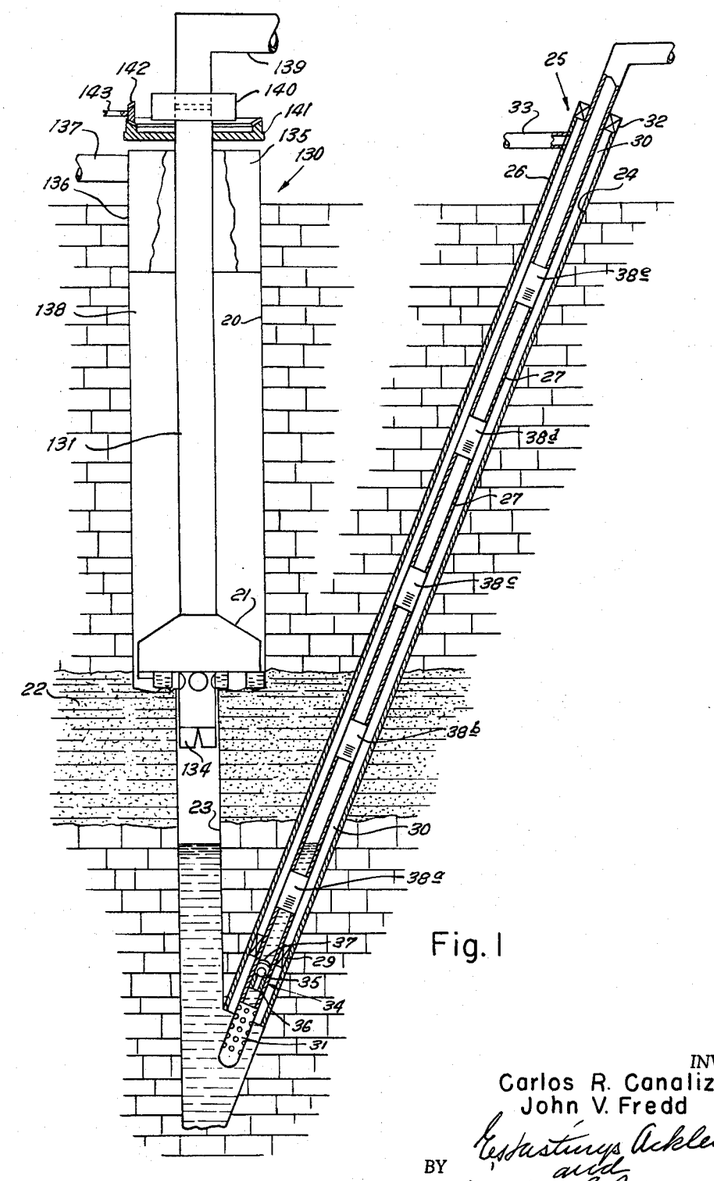
FIGURE 1 is a schematic illustration of a well bore of a drilling apparatus for drilling the well bore and of a transportation system embodying the invention for transporting liquid from the well bore by means of which the transportation method of the invention may be practiced.

FIGURE 1 illustrates an apparatus and method embodying the invention for drilling a large diameter well or well bore 20 which utilize the circulation of gas under relatively low pressure to remove the cuttings of the earth formations made by the drill bit 21 during the drilling of the well bore in locations where the well bore must extend through a porous water bearing earth stratum or information 22. If previous exploration of the earth formations at the location of the well bore has revealed the existence of the water bearing formatin, the method includes the initial step of drilling a pilot bore 23 of small diameter through the earth formations to a depth below the desired location of the bottom of the large diameter well bore by conventional drilling apparatus which circulates a drilling liquid, such as a weighted mud or water to which suitable additives such as gels have been added, into the pilot bore and then upwardly through the drilling pipe of the apparatus to remove the cuttings. Since the surfaces of the porous earth formations opening to and defining such small diameter pilot bore have relatively small areas, the loss of the drilling liquid into such formations is relatively small since the drilling liquid tends to seal such earth formations at such surface. The total quantity of the drilling liquid needed for proper circulation during the drilling is of course relatively small and economically feasible. A water removal bore 24 is then drilled angularly form the surface at a location spaced from the desired location of the well bore 20 to intersect the pilot bore below the earth formation 22 and below the depth at which the bottom of the well bore 20 is to be located. The water removal bore is also drilled by conventional methods using drilling liquids to remove the cuttings from the bore. A water removal apparatus 25 is then installed in the water removal bore and includes a casing 26, a small diameter tubing 27 and a packer 29. The packer closes the lower end of the annulus or cylindrical gas passage 30 between the tubing and the casing adjacent the lower end of the casing and above a strainer 31 secured to the lower end of the tubing. A suitable closure means 32 through which the tubing extends upwardly is secured to the upper end of the casing and closes the upper end of the gas passage. Gas under pressure is introducible into the gas passage through a supply pipe or conduit 33 connected to the casing at the surface.

A check valve 34 is mounted in the lower end of the tubing above the strainer and includes a ball valve 35 movable between a seat member 36 and a stop 37. The check valve permits upward flow of fluids and prevents downward flow therethrough.

Figure 4:
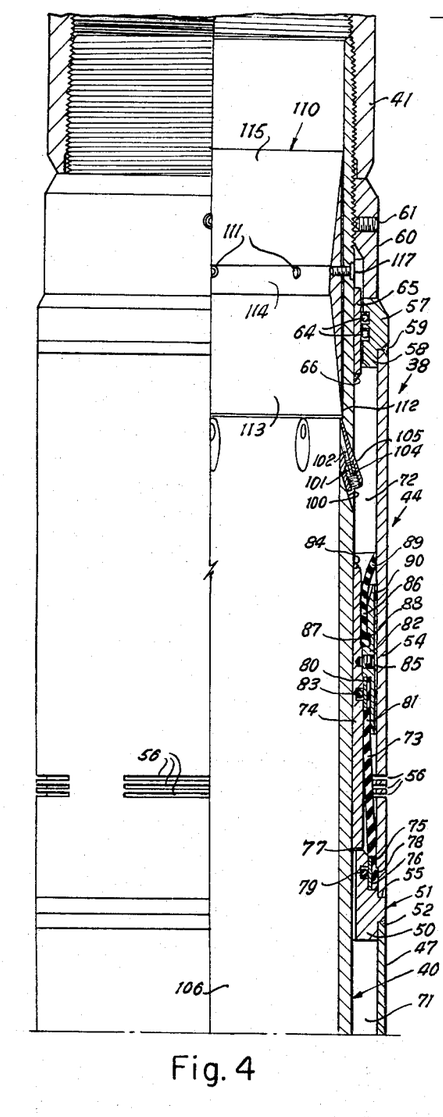
FIGURE 4 is a vertical partly sectional view of the upper portion of a flow control device of the invention used in the transportation apparatus of the invention.
Figure 5:
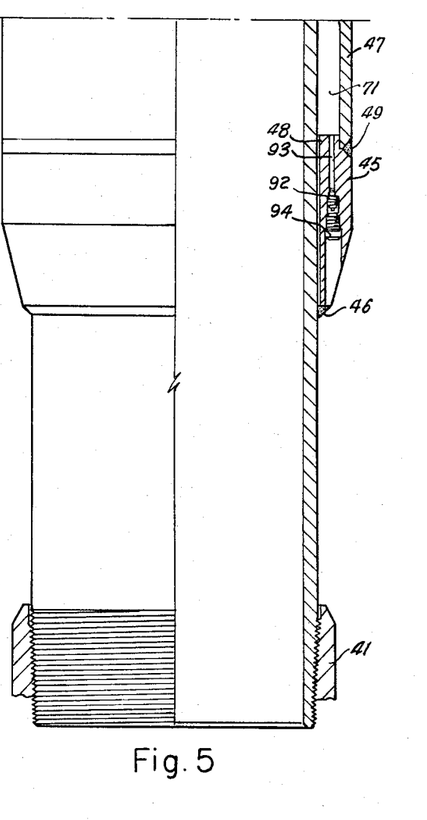
FIGURE 5 is a view, similar to FIGURE 4, being a continuation thereof, showing the lower portion of the flow control device.

The string of tubing has a plurality of flow control devices or ejector pumps 38a–38e connected therein at longitudinally spaced locations which control the flow of gas from the gas passage into the string of tubing to pump or eject water from the lower end of the pilot bore through the tubing to the surface. Each of the ejector pumps includes a tubular mandrel 40 externally threaded at its upper and lower end portions whereby it may be connected by the usual coupling collars 41 to adjacent ends of adjacent sections of the tubing to constitute a section of the tubing. A cylindrical sleeve 44 is disposed about the mandrel intermediate its ends and includes a tubular bottom section 45 rigidly secured to the mandrel in seal tight relation therewith by a weld 46. A tubular chamber section 47 of the sleeve has a lower end portion telescoped over the reduced upper end portion 48 of the bottom sleeve section and rigidly secured thereto in seal tight relationship by a weld 49. The upper end of the chamber sleeve section telecopes over the reduced lower end portion 50 of a connector section 51 of the sleeve and is rigidly secured thereto in seal tight relationship by the weld 52.

A tubular port section 54 of the sleeve is telescoped downwardly over the upper portions of the connector section with its downward movement limited by the engagement of its annular bottom end shoulder surface with the upwardly facing annular shoulder 55 of the connector section. The port sleeve section has a plurality of lateral ports 56 intermediate its ends. The top section 57 of the sleeve has a reduced lower end portion 58 telescoped into the upper end portion of the port sleeve section and rigidly secured thereto in seal tight relationship by the weld 59. The port and top sections of the sleeve are held against upward movement on the mandrel by a retainer ring 60 threaded on the upper end portion of the mandrel and rigidly secured thereto in any adjusted position by a set screw 61. The bottom annular end surface of the retainer ring abuts the upper end surface of the top sleeve section.

The top sleeve section has a pair of internal annular recesses in which are disposed O-rings 64 which seal between the top section and a seal ring 65 rigidly secured to and in seal tight relationship with the mandrel by a weld 66.

The mandrel 40 and the sleeve 44 define an annular space about the mandrel closed at the upper and lower ends by the bottom and top sleeve sections and separated into a lower annular charge chamber 71 and an upper flow passage 72 by a resilient tubular closure or valve member 73. The valve member is disposed within the sleeve and about the upper inner support portion 74 of the connector sleeve section which is spaced inwardly of the port sleeve section. The lower end portion of the valve member has an internal rigid bottom ring 75, which may be bonded thereto, which telescopes over the annular external surface 76 of the connector sleeve section below its circumferentially spaced lateral ports 77. The lower end portion of the valve member is compressed against and sealingly engages the internal annular surface of the port sleeve section below its downwardly facing annular shoulder 78 and is thus held against upward displacement. An O-ring 79 disposed in an external annular recess of the connector sleeve section seals between the bottom ring 75 of the valve member and the connector section.

A top ring 80 is similarly disposed in the upper end portion of the valve member and may be bonded thereto. The upper end portion of the valve member telescopes into the enlarged lower portion 81 of the bore of an annular outer support member 82 and is compressed against and sealingly engages the internal surfaces of the outer support member defining the enlarged portion. An O-ring 83 disposed in an external annular recess of the inner support portion 74 seals between the ring 80 and the support portion. The upper end of the support portion of the connector sleeve section is rigidly secured in seal tight relationship to the mandrel by a weld 84. The outer support membr is secured to the support portion by any suitable means, as by a set screw 85.

The inner support portion 74 and the outer support member 82 hold the lower portions of a tubular resilient check valve 86 therebetween, the outer support member having an internal annular recess 87 in which is received an external annular flange 88 of the check valve. The upper annular lip portion 89 of the check valve is engageable with the internal surfaces of the port sleeve section to prevent downward flow through the annular flow passage to the ports 56 and is flexible resiliently inwardly to permit flow of fluids from the ports 56 and through the circumferentially spaced longitudinal slots 90 of the outer support member and thus through the flow passage 72.

Fluid under pressure is introducible into the charge chamber 71 through a suitable valve 92 threaded in an enlarged intermediate portion of the filler passage 93. A protector plug 94 is threaded in a lower enlarged threaded portion of the passage to protect the valve.

It will be apparent that the force of the charge of compressed gas in the chamber 71, communicated to the internal surface of the valve member intermediate its ends through the radial ports 77 of the connector sleeve section, biases the valve member outwardly toward expanded position and into sealing engagement with the internal surface of the port sleeve section about its lateral ports 56 to close the ports to inward flow of fluid therethrough and that the valve member will be moved inwardly to its retracted or open position to open the ports when the pressure exteriorly of the sleeve exceeds the pressure in the chamber 71.

The mandrel 40 above the check valve 86 has a plurality of circumferentially spaced upwardly and inwardly extending apertures 100 in which are disposed tubular inserts 101. The upper end portions 102 of the bores or passages of the inserts flare upwardly, i.e., increase in diameter upwardly. The lower enlarged threaded portion of the passages open to the passage 72 above the check valve 86. Beans 104 having orifices 105 are threaded in the lower threaded portions of the inserts. The orifices 105 of the beans communicate with the passage 72 and the flared upper portion 102 of the passages of the inserts. The rate of flow of gas from the passage 72 into the internal longitudinal passage or bore 106 of the mandrel, at any given pressure of the gas in the flow passage 72, may be adjusted by providing beans of desired orifices. The inserts 101 and the beans 104 are preferably made of a very hard wear resistant substance to minimize their flow cutting by the gas flowing therethrough.

The upper ends of the passages of the inserts open to the inner longitudinal passage 106 of the mandrel below the lower end of an annular passage restricting member 110 rigidly secured by the screws 111 in the enlarged upper end portion of the longitudinal passage of the mandrel. The lower end of the passage restricting member is disposed immediately above the annular upwardly facing shoulder 112 of the mandrel and the lower upwardly and inwardly extending internal surface 113 of the restricting member at its lower end is of substantially the same diameter and flush with the internal surfaces of the mandrel defining the passage 106 below the shoulder 112 to minimize turbulence in gases flowing upwardly through the restricting member. The restricting member also has an intermediate or central cylindrical surface 114 and an upwardly and outwardly extending upper internal surface 115.

Due to the restriction of the flow passage of the mandrel above the upper ends of the passages of the inserts, gas flowing into the mandrel through the inserts increases in velocity. The pumping or ejector action of the gas injected into the mandrel from the gas passage 30 of the water removal apparatus, whose effect is intensified by the restriction of the mandrel flow passage immediately above the upper ends of the flow passages of the inserts, tends to move fluids in the tubing upwardly to the surface. The pressures of the charges of gas in the charge chambers of the ejector pumps 38a–38e connected in the string of tubing 27 increase progressively with the location of ejector pumps in the water removal bore, the lowermost ejector pump 38a having the greatest charge pressure and the uppermost ejector pump 38e having the lowest charge pressure so that as the pressure of the gas in the gas passage 30 is increased by introducing or pumping gas into the gas passage through the inlet conduit 33, the ejector pumps will open progressively and successively, the uppermost ejector pump 38e opening first, then the next lower ejector pump 38d, and so on until the lowermost ejector pump 38a opens.

The large diameter well bore 20 is drilled by a drilling apparatus 130 which includes the usual drill pipe 131 to whose lower end is rigidly secured the drill bit 21 which drills a large diameter well bore, for example, four or more feet. The drill bit 21 includes a guide drill bit 134 which extends downwardly from the large drill bit into the pilot bore 23. The string of drill pipe 131 extends through a suitable casing head 135 secured to the upper end of a casing 136 which extends a short distance into the ground. The casing head has an inlet conduit or pipe 137 which opens to the annulus or gas passage 138 about the drill pipe so that large volumes of air under relatively low pressure may be introduced or pumped into the upper end of the large annulus and flow at relatively low velocity to the bottom of the bore and then flow upwardly with increased velocity through the longitudinal flow passage of the drill pipe of small diameter thus carrying cuttings upwardly from the well bore to the surface through the drill pipe and the conduit 139 which is connected to the upper end of the drill pipe by a suitable swivel 140 in order that the drill pipe can rotate relative to the outlet conduit 137. The drill pipe is rotated in the usual manner as by the large gear 141 which is driven by a small gear 142 on a drive shaft 143 driven by any suitable prime mover means. The drill pipe extends non-rotatably but slidably through the large gear. Cuttings from the earth formations being bit or fragmented by the drill bit as it rotates are readily transported to the surface through the drill pipe by the gas introduced under relatively low pressure into the well bore at the surface as long as no appreciable amounts of water flow into the well at the bottom of the well bore of the hole due to the penetration of the drill bit through a water bearing formation, such as the formation 22. The water flowing into the well bore from such formation could be forced out of the well bore by increasing the pressure of the gas being introduced into the well through the inlet conduit 137. In a large diameter well bore, and especially where the formations penetrated by the well bore are quite porous, any increase in the gas pressure sufficient to force the water back into the water bearing formation or to remove it through the drill pipe 131 would require a great rate of flow of the air into the well bore. In addition, if the pressure of the gas in the hole is greater than the formation pressure being penetrated by the drill bit, the efficiency of the drilling operation is decreased. It is well known that if the pressure at the bottom of the well bore is maintained at a value somewhat less than the natural formation pressure at that location, the drill operation is more efficient and proceeds more rapidly. In addition, if the upper formations or strata above the water bearing formation 22 are themselves porous, large quantities of air pumped into the well bore at the surface would be lost to such formations.

The water flowing out of the water bearing porous formation 21 accumulates in the pilot bore 23 and flows upwardly into the string of tubing 27 through the strainer 31 and past the check valve 34 which permits upward flow of fluids into the string of tubing at its lower end. If at the initiation of operation of the water removing apparatus 25, the water has accumulated in the tubing 27 to a height above the second lowermost flow control device or ejector pump 38b, the operation of the water removing apparatus 25, initiated by introducing gas under pressure into the annulus or gas passage 30 through the inlet conduit 33, first increases the pressure in the gas passage to the value at which the uppermost ejector pump is rendered operative, and gas under high pressure, for example, 600 p.s.i., flows through the ejector pump into the flow passage of the tubing and lowers the pressure in the string of tubing below the locations of injection of the gas into the string of tubing. As the pressure in the gas passage continues to increase, the next lower ejector pump 38d and then the ejector pump 38c are rendered operative and the flow of gas therethrough into the tubing decreases the pressure in the tubing below the locations of the injection of the gas through these two ejector pumps. As the pressure continues to increase in the gas passage, the ejector pump 38b is rendered operative and the gas from the gas passage begins to flow into the tubing beneath the column of water in the tubing below the passages 112 of the inserts 110 of the ejector pump 38b. The inertia of this column of water causes the pressure in the tubing thereat to increase and the increased pressure is communicated to the check valve 34 and moves it to its closed position thus preventing downward flow of the water into the pilot bore from the string of tubing below the ejector pump 38b. As the gas continues to flow into the tubing through the ejector pump 38b, it lifts the column or slug of water thereabove upwardly through the tubing. The upward movement of this slug of water accelerates as its inertia is overcome and as the gas continues to flow into the tubing through the ejector pump 38b. The upward movement of the slug of water is of course accelerated by the pump action of each next higher ejector pump 38d and 38e until the slug of liquid flows upwardly and out of the upper end of the string of tubing.

As the introduction of the gas into the gas passage continues, at a greater rate than the rate of flow thereof into the tubing through the upper now open ejector pumps, its pressure in the gas passage increases to the value at which the lowermost ejector pump 38a is rendered operative. Gas flowing into the tubing below the column or slug of water between the ejector pump 38b and the ejector pump 38a now causes the check valve 34 to close, if it is not already closed, due to the inertia of this slug of water. This second slug or column of liquids is moved upwardly through the tubing to the surface by the gas which continues to flow into the tubing through the lowermost ejector pump. Each ejector pump above the lowermost ejector pump 38, of course, aids in moving this water to the surface. As the slug or column of liquid flows upwardly and out of the upper end of the tubing, the pressure in the tubing below the open lowermost ejector pump decreases and the check valve 34 is moved to its open position as the pressure within the lower end of the tubing drops below that in the lower end of the pilot bore and water flowing into the pilot bore is moved upwardly through the check valve and the tubing to the surface as the ejector pumps continue to operate and gas from the gas passage continues to flow therethrough into the tubing. The drilling of the well bore is now continued with the cuttings being removed through the drill pipe by the upward flow therethrough of the low pressure gas introduced into the well bore through the conduit 37.

If the pressure of the water bearing formation 22 to be penetrated by the large diameter well bore is not known at the initiation of the drilling, the pilot bore is drilled when its presence is discovered during the drilling of the large diameter well bore. In this event, suitable small diameter casing is installed in the large well bore and the pilot bore is drilled by conventional methods employing a drilling liquid which is circulated through such small diameter casing and the drill pipe. The water removal bore is then drilled and the water transportation or removal apparatus is installed therein in the manner previously described.

It will now be seen that the new and improved method of drilling large wells through porous water bearing formations employing air at relatively low pressures for removing the cuttings made by the drill bit, includes drilling a pilot bore of relatively small diameter through the water bearing formation to a level below the depth to which the large diameter well bore is to be drilled, drilling a water removal bore of relatively small diameter to intersect the pilot bore adjacent its bottom, installing water removing or transporting means in the water removal bore for transporting water from the pilot bore to the surface, and operating the water removal means during the drilling of the large diameter well bore.

It will further be seen that the water transporting apparatus may include a conduit open at its lower end to the pilot bore and having a plurality of longitudinally spaced ejector pumps connected therein and operable by gas under pressure introduced into the water removal bore at the surface and injectable into the conduit through the injector pumps and that the method may include the additional step of closing the conduit at its lower end when the water in the conduit at the time of initiation of operation of any ejector pump extends to a level above such ejector pump.

It will further be seen that a new and improved liquid transporting apparatus 25 has been illustrated and described which includes a conduit or tubing 27 having one or more ejector pumps 38 connected therein for introducing gas under pressure into the conduit from the exterior of the conduit when the pressure exteriorly of the conduit exceeds a predetermined value.

It will further be seen that the ejector pump includes a tubular mandrel connectable in the conduit to constitute a section thereof and having a plurality of circumferentially spaced passages extending convergently inwardly in one longitudinal direction for directing gas into the mandrel from the exterior thereof, and valve means openable when the pressure exterior of the mandrel exceeds a predetermined value to permit flow through the passages into the mandrel.

It will further be seen that the mandrel is provided with a flow restricting member adjacent and located downstream of the radially spaced passages.

It will further be seen that the annular flow passage 72 and a plurality of radially spaced passages communicating the mandrel with the annular flow passage permit a large volume of gas to flow into the mandrel at one location while maintaining the external diameter of the ejector pump relatively small while the bore 106 of the mandrel is substantially equal to the bore of the tubing.

Figure 2:
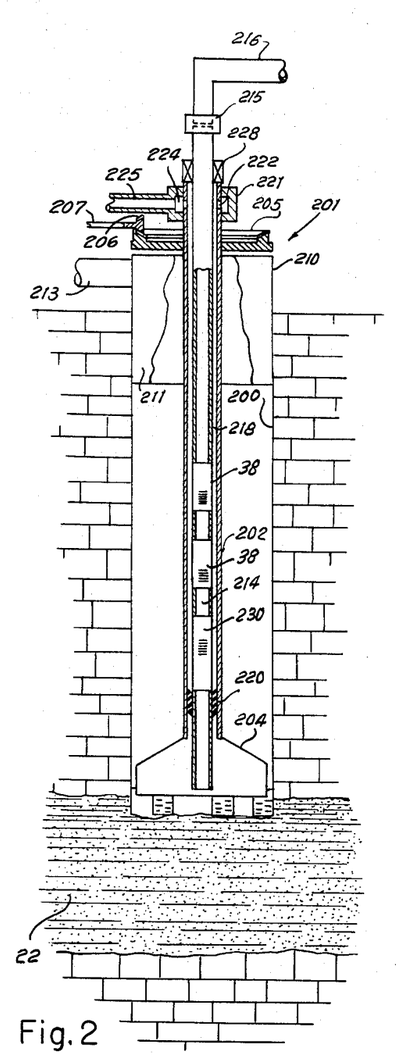
FIGURE 2 is a schematic illustration of another drilling apparatus including a transportation apparatus of the invention.

FIGURES 2, 6, 7 and 8 of the drawings illustrate another method and apparatus of the invention for drilling a large diameter well bore and removing or transporting water from the well bore during the drilling operation. The large diameter well bore 200 illustrated in FIGURE 2 is drilled by a drilling apparatus 201 which includes a string of drill pipe 202 to whose lower end is secured a suitable drill bit 204. The drill pipe is rotated at the surface by any suitable means such as a large gear 205, through which the drill pipe extends vertically slidably but non-rotatably, and a gear 206 on a drive shaft 207 driven by any suitable prime mover. The drill pipe extends rotatably through a suitable casing head 210 to which is secured a casing 211 which extends downwardly into the well bore. Gas under relatively low pressure, for example as low as 5 to 6 p.s.i., is introduced into the casing head, and therefore into the upper end of the well bore, through an inlet or conduit 213 and flows downwardly to the bottom of the well bore and then upwardly through a string of tubing 214 to the surface at an increased velocity to carry the cuttings of the earth formations penetrated by the drill bit to the surface. The tubing extends through the drill pipe 202 and is rigidily secured thereto. The upper end portion of the tubing extends outwardly of the upper end of the drill pipe and is secured by a suitable swivel 215 to an outlet conduit or pipe 216 through which the air with the cuttings carried thereby is transported to any desired location. The lower end of the annulus or cylindrical gas passage 218 between the string of tubing and the drill pipe is closed by a suitable seal or packer 220. The drill pipe at its upper end extends rotatably through a suitable manifold 221 and is provided with a plurality of ports 222 which open to the annular passage 224 of the manifold. The manifold has an inlet pipe or conduit 225 through which gas under high pressure is introducible to the upper end or the gas passage 218 by means of the manifold and the ports of the drill pipe. The upper end of the annular or gas passage 218 is closed by a suitable packer or seal 228 which seals between the string of tubing and the drill pipe.

A flow control device 230 is connected in the tubing to constitute a section thereof above the bottom packer 220. If desired, or required, one or more ejector pumps 38 are connected in the tubing above the flow control device 230.

Figure 6:
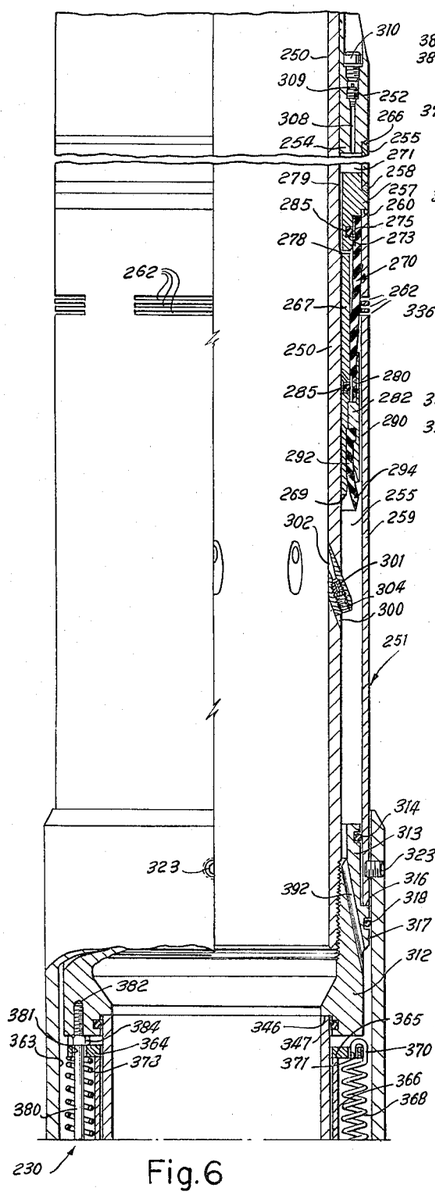
FIGURE 6 is a vertical partly sectional view of the upper portion of another flow control device of the invention usable in the transportation apparatus of the invention.
Figure 7:
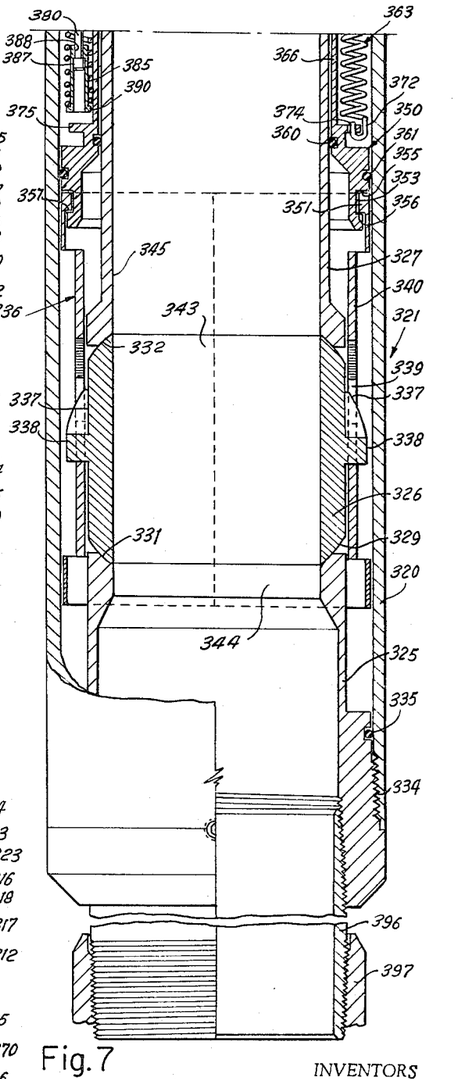
FIGURE 7 is a view, similar to FIGURE 6, being a continuation thereof, showing the lower portion of the flow control device.
Figure 8:
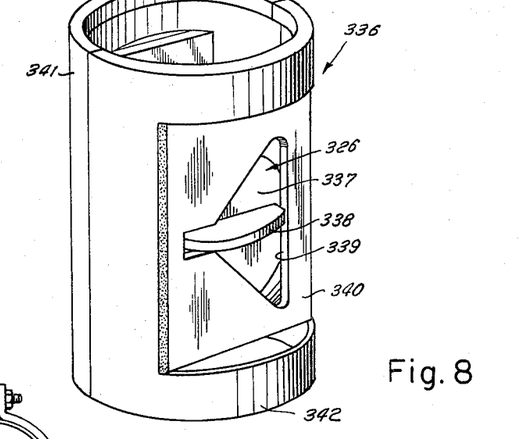
FIGURE 8 is a perspective view of a valve assembly of the flow control device illustrated in FIGURES 6 and 7.

The flow control device 230, FIGURES 6, 7 and 8, includes a mandrel 250 whose upper end portion is threaded whereby it may be connected at its upper end to a section of the tubing 214 by a usual coupling collar. A sleeve 251 is disposed about the mandrel and includes a top section 252 whose lower end which is rigidly secured to the mandrel in seal tight relationship by a weld (not shown). The top section has a reduced lower end portion 254 which telescopes into the upper end of a charge chamber sleeve section 255 and is rigidly secured thereto in seal tight relation by a weld 256. The lower end of the chamber section telescopes over the upper reduced portion of a connector sleeve section 257 and is secured thereto in seal tight relationship by the weld 258. The upper end portion of the port section 259 of the sleeve telescopes over an intermediate reduced portion of the connector section, its upward movement relative to the connector section being limited by the engagement of its annular top end surface with the annular shoulder 260 of the connector section. The port section has a plurality of lateral apertures or ports 262 through which fluids from the exterior of the sleeve may flow into the annular flow passage 265 between the sleeve and the mandrel. The connector section has a lower cylindrical inner support portion 267 which extends downwardly therefrom and is rigidly secured to the mandrel in seal tight relationship by the weld 269. A tubular resilient valve member 270 separates the annular space between the sleeve and the mandrel into an upper annular charge chamber 271 and the flow passage 265. The valve member has an upper end portion extending upwardly past an intermediate outer surface 273 of the connector sleeve section and compressed into sealing engagement with the internal surfaces of the port section above its ports 262. An internal ring 275 is bonded or otherwise secured to the valve member. An O-ring 276 is disposed in suitable external annular recess of the connector sleeve section and seals between the ring 275 and the connector sleeve section.

The connector sleeve section is provided with a plurality of lateral circumferentially spaced ports 278 which provide communication between the charge chamber, through the annular passage 279 between the connector sleeve section and the mandrel, to the interior of the valve member.

The lower end portion of the tubular valve member extends into the enlarged upper end portion 280 of the bore of an outer tubular support member 282 and is held in compressed sealing engagement therewith. An annular internal ring 284 in the lower end portion of the tubular member and bonded thereto is sealingly engaged by an O-ring 285 disposed in an external annular recess of the inner support section 267. The outer support member is provided with a plurality of circumferentially spaced longitudinal slots 290. A tubular resilient check valve 292 has its upper portion secured between the inner and outer support members and has an annular lip portion 294 which is adapted to sealingly engage the internal surfaces of the port sleeve section to prevent upward flow of fluids therepast.

The mandrel has a plurality of circumferentially spaced inwardly and upwardly extending apertures 300 in which inserts 301 are rigidly secured in any suitable manner, as by welding. The inserts have upwardly and inwardly flared passages 302 which open to the interior of the valve and beans 304 threaded in the enlarged outer portion of the passageways. The orifices 305 of the beans communicate with the flared passages of the inserts and the passage 265.

A charge of gas is introducible into the charge chamber 271 through a filler passage 308 in the top sleeve section and a suitable inlet valve 309 threaded in an intermediate enlarged portion of the filler passage. A plug 310 is threaded in an outer enlarged portion of the filler passage to protect the inlet valve.

The mandrel has an annular bottom port ring 312 threaded on its lower end. The upper reduced annular end portion 313 of the port ring extends upwardly between the port sleeve section and the mandrel and has an external annular recess in which is disposed an O-ring 314 or other suitable sealing means for sealing between the port ring and the port sleeve section. Downward movement of the port sleeve section relative to the port ring is limited by the engagement of its bottom end shoulder with the upwardly facing annular shoulder 316 of the port ring provided by the external annular flange 317 thereof. The flange has an external annular recess in which an O-ring 318 is disposed which seals between the port ring and a tubular housing 320 of a pressure operated valve assembly 321. The valve housing telescopes over the lower end portion of the port sleeve section and is rigidly secured thereto by screws 323.

The valve assembly 321 includes a bottom tubular seat member 325, a ball valve 326 and a top tubular seat member 327. The spherical seat surface 329 of the ball valve is sealingly engageable with the arcuate annular seat surfaces 331 and 332 of the bottom and top seat members. The ball valve is rotatably mounted between the two seat surfaces. The lower end of the valve housing is threadedly secured as at 334 to the bottom seat member and an O-ring 335 disposed in a suitable external annular recess of the bottom seat member seals between the bottom seat member and the valve housing.

The ball valve 326 and the control frame 336 which rotates the ball valve between its open and closed position may be of substantially the same type fully described in the patent to James H. Bostock, No. 2,894,715, July 14, 1959. The ball valve has a pair of opposed planar surfaces 337 from which extend outwardly disk like cam lugs 338. The cam lugs extend into substantially triangular shaped cam slots 339 in the flat plates 340 of the identical sections 341 and 342 of the frame 336. Each section of the control frame is substantially semicylindrical in shape. The flat plates 340 are rigidly secured, as by welding, in a cut out portion or longitudinal recess 343a of each control frame section. As is fully explained in the patent to Bostock, No. 2,894,715, the camming engagement of the cam lugs 338 with the edges of the flat planes defining the slots 339 when the control frame is moved downwardly in the housing rotate the ball valve from its open position illustrated in FIGURE 7, wherein the axial passage 343 of the ball valve is in alignment and communication with the longitudinal flow passages 344 and 345 of the bottom and top seat members, to a closed position wherein the passage of the ball valve extends transversely of the flow passages of the seat members and is out of communication therewith. When the ball valve is in such closed position, upward movement of the control frame to its upper position illustrated in FIGURE 7, rotates the ball valve back to its open position. The upper end portion of the top seat member is telescoped in the enlarged lower end portion of the passage of the ring port and is held against upward movement by the engagement of its annular top end surface with the internal annular shoulder 346 of the ring port. An O-ring 347 seals between the top seat member and the port ring.

The control frame is connected at its upper end to the lower end of an annular piston 350 by means of the internal flanges 351 at the upper ends of the control frame sections which extend into the external annular recess 353 of the piston. The two control frame sections are held against outward movement by the engagement of their outer surfaces with the internal surfaces of the valve housing. The engagement of their top end surfaces with the downwardly facing shoulder 355 defining the upper end of the piston recess 353 limits downward movement of the piston relative to the control frame sections. The engagement of the bottom downwardly facing shoulders 356 of the flanges with the upwardly facing annular shoulder 357 defining the bottom end of the piston recess limits upward movement of the piston relative to the control frame sections.

The piston 350 of the valve assembly 321 has an internal annular recess in which is disposed an A-ring 360 which seals between the piston and the top seat member and an external annular recess in which is disposed an O-ring 361 which seals between the piston and the valve housing 320. The piston is biased upwardly by a biasing assembly 363 which includes a floating ring 364 longitudinally movably disposed about the top seat member and engageable with the annular top end surface 365 of the tubular piston extension 366, a plurality of tension springs 368 spaced about piston extension have their upper hook end portions 370 hooked through circumferentially spaced apertures 371 of the floating ring and their lower hook end portions 372 hooked through similarly spaced apertures 374 of an external annular flange 375 of the piston. Each of a plurality of compression springs 378 is disposed about a rod 380 which extends upwardly through suitable apertures 381 of the floating ring into a downwardly opening threaded bore 382 of the port ring. An adjusting and locking nut 384 is threaded on the threaded top end portion of the rod between the bottom surface of the port ring and the top surface of the floating ring. The nuts 384 limit upward movement of the floating ring and provide a means for adjusting the distance the rod extends below the port ring. A tubular spring retainer 385 is telescoped over the head 387 of the rod, its downward movement being limited by the engagement of its internal annular flange 388 with the top annular stop shoulder of the rod head. The lower end of the compression springs abuts the top annular flange 390 of the spring retainer while its upper end bears against the lower surface of the floating ring. The tension and compression springs are preferably arranged alternately about the piston extension and may be of any desired number, for example, seven tension springs and seven compression springs. The assembly of the floating ring and the tension and compression springs permit the entire assembly to be relatively short and also permits a short travel of the piston which reduces wear of the seals past which the piston moves.

Fluid pressure from the passage 265 is communicated to the upwardly facing surfaces of the piston between the lines of sealing engagement of the piston O-rings 360 and 361 with the top seat member and the valve housing, respectively, through a plurality of ports 392 in the port ring whose upper ends communicate with the lower end of the passage 265 through the annular space or passage 393 between the port ring extension 313 and the mandrel 250.

It will now be apparent that the biasing assembly 363 biases the piston to its upper position wherein the valve assembly 321 is in its open position and fluids can flow upwardly through the mandrel, the seat members and the ball valve. When the pressure exteriorly of the valve exceeds the pressure of the charge of compressed gas in its charge chamber 271, the valve member 270 is moved to the open position shown in FIGURE 6 and the high pressure from the exterior is communicated through the flow passage 265 and the ports 392 to the upwardly facing surfaces of the piston and moves the piston downwardly against the resistance of the biasing springs. As the piston moves the control frame 336 downwardly, the ball valve is rotated through approximately 90 degrees to its fully closed position. The gas flowing from the exterior of the flow control device now flows through the passage 265 and the passages of the inserts into the mandrel 250. When the pressure exteriorly of the flow control device is decreased below the pressure in the charge chamber 271 the piston will be moved upwardly by the biasing springs and the ball valve will again move to its open position.

Figure 9:
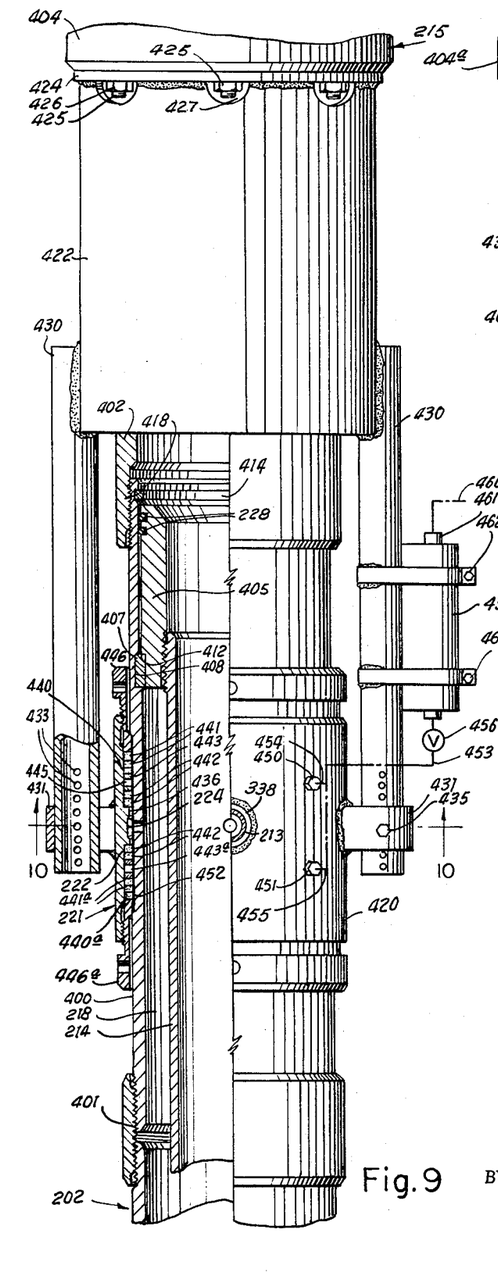
FIGURE 9 is a vertical, partly sectional view of the upper portions of the assembly of the drilling and transportation apparatus illustrated in FIGURE 2.
Figure 10:
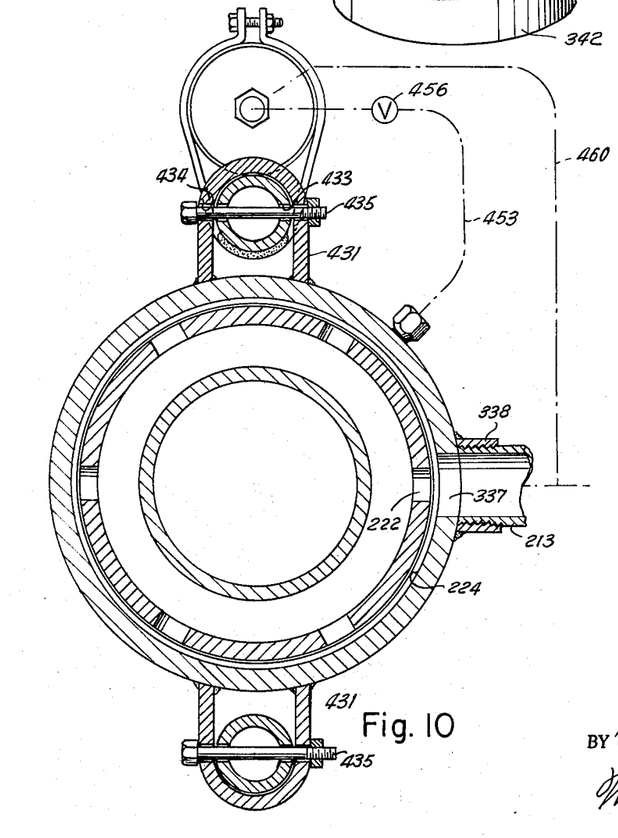
FIGURE 10 is a sectional view taken on line 10—10 of FIGURE 9.

FIGURES 9 and 10 illustrate in detail the structure for connecting the drill pipe 202, the tubing 214 and the manifold 221 which permits simultaneous rotation of the drill pipe and the tubing, the introduction of gas under pressure into the upper end of gas passage 218 for downward flow therethrough and the upward flow of fluids through the tubing to the outlet conduit 216. The drill pipe 202 has a top port section 400 connected to lower sections of the usual drill pipe by a collar 401. The port section is threaded in the lower end of the inner rotatable tubular member 402 of a usual swivel 215 whose nonrotatable upper outer member 404 is connected to a suitable hoist which supports the drill pipe and the tubing during the drilling of the well bore 200. A tubular tubing hanger 405 is disposed in the upper end portion of the port section and its downward movement therein is limited by a split ring 407 whose outer portions are disposed in an internal annular recess 408 of the port section and whose inner portions extend into an external downwardly opening recess of the tubing hanger. The engagement of the top surface of the split ring with the downwardly facing annular shoulder 412 defining the upper end of the external recess limits downward movement of the tubing hanger in the port section. Upward movement of the hanger in the port section is limited by a split ring 414 whose outer portions are received in an internal annular recess 416 of the port section and whose inner portions extend inwardly of the bore of the port section to engage the top annular surface of the hanger.

The sealing means 228 for closing the top end of the gas passage may be in the form of O-rings disposed in suitable external annular recesses of the tubing hanger which sealingly engage the internal surface of the port section.

The manifold 221 includes a seal sleeve 420 rigidly secured to a sleeve 422 which extends about the rotatable swivel member 402 and has an external annular flange 424 which abuts the lower end surface of the stationary swivel member and is rigidly secured thereto by suitable circumferentially spaced studs 425 which extend downwardly from the stationary swivel member through suitable apertures in the flange, and the nuts 426 threaded on the studs. The sleeve 422 may be provided with apertures 427 to accommodate the nuts. A pair of dependent tubular legs 430 have their upper ends rigidly secured to the sleeve 422 by welds and extend downwardly through substantially U-shaped brackets 431 rigidly secured to the seal sleeve 420 by welds. The legs 430 have a plurality of pairs of vertically spaced transverse apertures 433, each pair of which may be aligned with similar apertures 434 in the brackets so that bolts 435 may extend therethrough to secure the seal sleeve to the legs 430 in any one of a plurality of vertical positions.

The seal sleeve has an internal annular flange 436 having the internal annular passage or recess 224 into which the ports 222 of the port drill pipe section open. A lateral port 337 of the seal sleeve opens to the recess 224 and to the inlet conduit or pipe 213 which is threaded into a tubular fitting 338 welded to seal sleeve about the lateral port. An upper packer assembly 440 is disposed between the seal sleeve and the port section for sealing between the seal sleeve and the port section above the internal flange 436. The packing assembly includes a plurality of upper seal rings 441 and a plurality of lower seal rings 442 which are separated by a rigid lantern ring 443. The lantern ring has a plurality of circumferentially spaced radial apertures 446 therethrough. The upper packer assembly is held against downward movement by the top annular shoulder of the internal flange 436 and is held against upward movement by a gland nut 446 threaded into the upper end of the seal sleeve.

A similar lower packer assembly 440a is disposed between the seal sleeve and the top drill pipe section below the internal flange 436 and similarly includes a plurality of lower seal rings 441a, upper seal rings 442a and a lantern ring 443a. The lower packer assembly is held against upward movement by the bottom annular surface of the internal flange 48 and against downward movement by the gland nut 446a which is threaded into the lower end of the seal sleeve. The seal sleeve has fittings 450 and 451 threaded in suitable lateral apertures of the seal sleeve, through which oil or grease under pressure may be introduced between the upper and lower seal rings of the upper and lower packer assemblies at the locations of the lantern rings 443 and 443a, respectively. The radial apertures of the lantern rings facilitate the movement of the oil or grease between the upper and lower sets of seal rings of each packer assembly and ensure uniform compression of the seal rings into sealing engagement with the seal sleeve and the port drill pipe section. The port drill pipe section below and above its ports 222 preferably has an outer layer of wear resistant metal to minimize wear due to the frictional engagement thereof with the packing assemblies as the port section rotates in the packer assemblies and to provide a smooth sealing surface for engagement by the seal rings. The oil or grease under pressure for lubricating the seal rings and for maintaining the seal rings under a predetermined compressional force is applied to the packer assemblies from a reservoir or accumulator 452 through a suitable conduit 453 whose lower end is connected by the branch conduits 454 and 455 to the inlet fittings 450 and 451 and whose upper end is connected to and opens into the lower end of the accumulator. A valve 456 may be connected in the conduit 453. The lubricant in the accumulator is maintained under relatively high pressure by means of a suitable conduit 460, one of whose ends is connected by a suitable fitting 461 to the top end of the accumulator and opens into the upper end of the accumulator. The other end of the conduit 460 is connected at a suitable location to the inlet conduit 213 by means of which gas under high pressure is introduced into the gas passage 218. The accumulator is mounted on one of the legs 430 by suitable resilient clamps 462 secured to the leg by welding and having free ends secured by bolts 463. The drill pipe 202 below the collar 401 which connects the lower portions of the drill string to its top port section extends longitudinally slidably but non-rotatably through the large gear 205.

Figure 11:
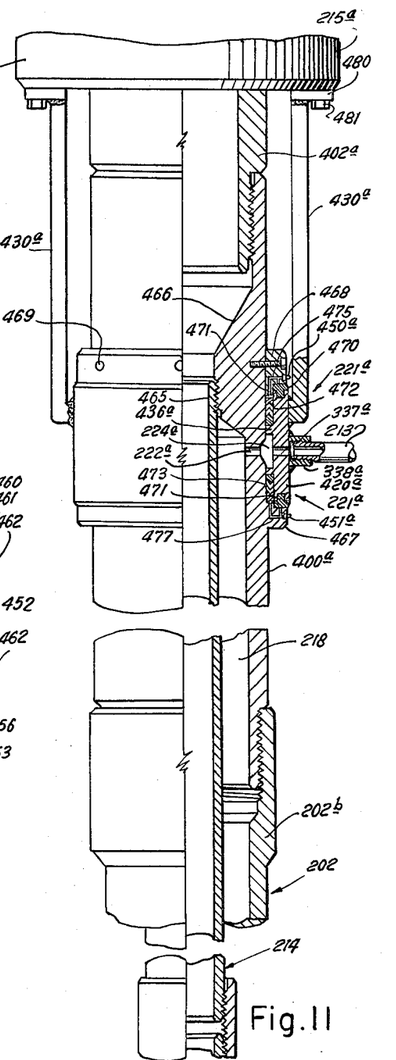
FIGURE 11 is a vertical partly sectional view of the upper portions of a modified form of the assembly of drilling and transportation apparatus illustrated in FIGURE 2.

An alternate structure for connecting the drill pipe and the tubing to the manifold 221a and to the usual swivel 215a by which the drill pipe and the tubing are supported by a hoist of the surface drilling equipment, is illustrated in FIGURE 11 and includes a top port drill pipe section 400a whose lower threaded end portion is threaded into the upper end of the immediately lower section 202b of the drill pipe. The elements of the structure illustrated in FIGURE 11 have been provided with the same reference numerals to which the subscript a has been added, as the corresponding elements of the structure illustrated in FIGURE 9. The upper end of the tubing 214 is threaded, as at 465, into the lower threaded portion of an internal annular flange 466 of the port drill pipe section. The rotatable member 402a of the swivel 215a is threaded into the upper end of the port drill pipe section. The port drill pipe section below the ports 222a which communicate with the gas passage 218 between the drill pipe and the tubing has an integral external annular flange 467 which limits downward movement of the seal sleeve 420a of the manifold 221a. The seal sleeve has an internal annular flange 436a having the internal annular recess or annular passage 224a. The seal sleeve has a lateral port 337a, a tubular fitting 338a welded to the seal sleeve in which is threaded the inlet conduit 213. Upward movement of the seal sleeve is limited by a lock ring 468 rigidly secured to the port drill pipe section 400a by screws 469. Suitable bearing rings 470 and 471 are provided at the top and bottom ends of the seal sleeve to engage the retainer ring and the external flange 467 to reduce the friction therebetween. An upper seal assembly in the form of a plurality of seal rings 472 is disposed below the bottom annular end surface of the retainer ring and the top annular surface of the internal seal sleeve flange 436a. A similar packing comprising a plurality of seal rings 473 is disposed between the bottom annular surface of the flange 436a and the upper surface of the external flange 467. A lubricant, such as oil or grease, in introduced through a suitable conduit connected to the fitting 450a and the passages 475 of the retainer ring to the seal rings 472 and also to the top bearing ring to maintain the seal rings under compression and to lubricate the contacting surfaces of the seal rings and of the bearings. The seal rings 473 of the lower packer assembly and the bearing ring 471 are lubricated by a lubricant under pressure from a conduit connected to the fitting 451a of the flange 467 and its passages 477.

The seal sleeve is rigidly secured to the non-rotatable member 404a of the swivel 215a by the legs 430a whose lower ends are welded to the seal sleeve and whose upper ends are welded to a ring 479 and are secured to the stationary swivel member by means of lugs 480 and bolts 481.

It will be apparent that the assembly of the drill pipe, the tubing string and the manifold illustrated in FIGURE 11 is of a more simple economical structure than the assembly illustrated in FIGURE 9 which serves the same purpose.

The tubing and the drill pipe are rigidly secured to one another, rotating together during the drilling operation, by the assemblies illustrated in FIGURES 9 and 11 in order to prevent movement of either the drill pipe or the tubing relative to the packer 230.

During the drilling of the large diameter bore 200 under normal conditions, gas under low pressure, for example, 6 p.s.i., introduced into the upper end of the well bore through the inlet conduit 213 and the casing head 210 flows downwardly into the bottom of the well bore and then upwardly into the lower open end of the tubing 214 which is disposed close as practicable to the bottom of the well. The ball valve 326 of the flow control device 230 is now in its open position. As this low pressure gas flows upwardly into the tubing, its velocity is greatly accelerated since the internal diameter of the tubing is relatively small, for example, 7 inches, as compared to the diameter of the well bore which may be several feet. As the low pressure gas flows into the lower end of the tubing, it carries the cuttings of the earth formations, and any normal relatively small amounts of water which may be flowing into the well bore during the drilling, upwardly therewith through the tubing for discharge at a suitable location at the surface through the outlet conduit 216. If the rate of production of cuttings is so great due to a fast rate of drilling or if the rate of flow of water into the well bore is so great that this circulation of low pressure gas is not effective to transport the cuttings, or both cuttings and water, to the surface at the same rate as the cuttings are being produced and the water is flowing into the well bore, gas under relatively high pressure, e.g. 600 p.s.i., is introduced into the gas passage at the surface through the inlet conduit 225 and the manifold 221. The pressure in the gas passage is thus raised above the values of the pressures of the charges of gas in the ejector pumps 38 but below the value of the pressure in the charge chamber 271 of the flow control device 230. The ejector pumps 38 are rendered operative and the high pressure gas flowing from the gas passage at a high velocity through the ejector pumps into the tubing aids in transporting the cuttings and water from the well bore to the surface through the tubing. The rate of transport of the cuttings and water is thus increased to the degree necessary. The values of the pressure of the gas in the charge chambers of the ejector pumps, if more than is connected in the tubing, increase as their depth in the well bore. Each ejector pump is rendered operative at a lower pressure of the gas in the gas passage than the next lower ejector pump and only such number of ejector pumps is rendered operative as is required to transport the cuttings and water from the well bore to the surface during the drilling of the well bore to economize on the use of the gas.

If during the cessation of the drilling operation, the well bore is filled with water to a level above the flow control device 230 so that a column of water is present in the ejector pumps and the circulation of the low pressure gas may not be effective to transport the water from the well to the surface through the tubing. Such column of water is transported from the tubing to the surface by introducing gas under pressure into the well bore through the inlet conduit 213 and gas under high pressure into the gas passage through the conduit 225. As the pressure of the gas in the gas passage rises, the ejector pumps are successively rendered operative. High velocity gas flows into the string of tubing through the ejector pumps and decreases the pressure in the tubing above the column of water. The pressure in the gas passage is now increased to a value above that necessary to render operative the lowermost ejector pump and above the pressure of the gas in the charge chamber 271 of the flow control device 230 to cause its valve member 270 to move to its open position. The pressure of the gas in the gas passage is then applied to the piston 350 and moves it downwardly against the resistance of the biasing springs 368 and 378. The ball valve closes almost immediately upon the movement of the valve member 270 to its open position due to the very large total orifice of the ports 262 as compared to the total orifice of the passages 302 of the inserts 301. Simultaneously, the high pressure gas from the gas passage commences to flow into the mandrel through the passages of the inserts to lift the column of water in the tubing thereabove to the surface. The movement of the ball valve to its closed position prevents the lifting gas from moving water downwardly through the lower end of the string of tubing back into the well bore since the initial velocity of flow of the gas through the insert passages is relatively slow due to the inertia of the column of water above the passages 302. As the column or slug of water is moved upwardly in the tubing and its upward movement accelerates, the rate of flow of air through the insert passages 302 increases. The slug of water, whose upward movement is accelerated by the action of the ejector pumps is thus transported to the surface. The pressure of the gas in the gas passage is then decreased below the pressure of the charge in its charge chamber 271 but above the pressure of the charges of gas in the charge chambers of the ejector pumps. The ball valve is then moved to its open position by the force of the biasing springs 368 and 378 when the valve member 270 moves back to its closed position and the pressure in the passage 255 decreases due to the communication of the passage 255 with the interior of the tubing through the insert passages. As the ball valves move to open position, the water in the well bore and the lower end of the tubing therebelow is now transported or moved upwardly through the tubing due to the pressure exerted thereon by the low pressure gas in the well bore and by the action of the ejector pumps through which the gas from the gas passage is still flowing into the tubing at a high velocity.

If the accumulation of the water in the well bore is so great that even after the transport of such column of water to the surface the circulation of the low pressure gas and the operation of the ejector pumps is not effective to transport the remaining water to the surface and a column of water again rises in the tubing above the flow control device 230, the above sequence of operations is repeated until the operation of the ejector pumps and the circulation of the low pressure gas is effective to transport any remaining water to the surface. The drill operation may then be resumed and the cuttings and any water which may continue to flow into the well bore will then be continuously transported to the surface by the circulation of the low pressure gas alone or in conjunction with the operation of the ejector pumps.

Figure 3:
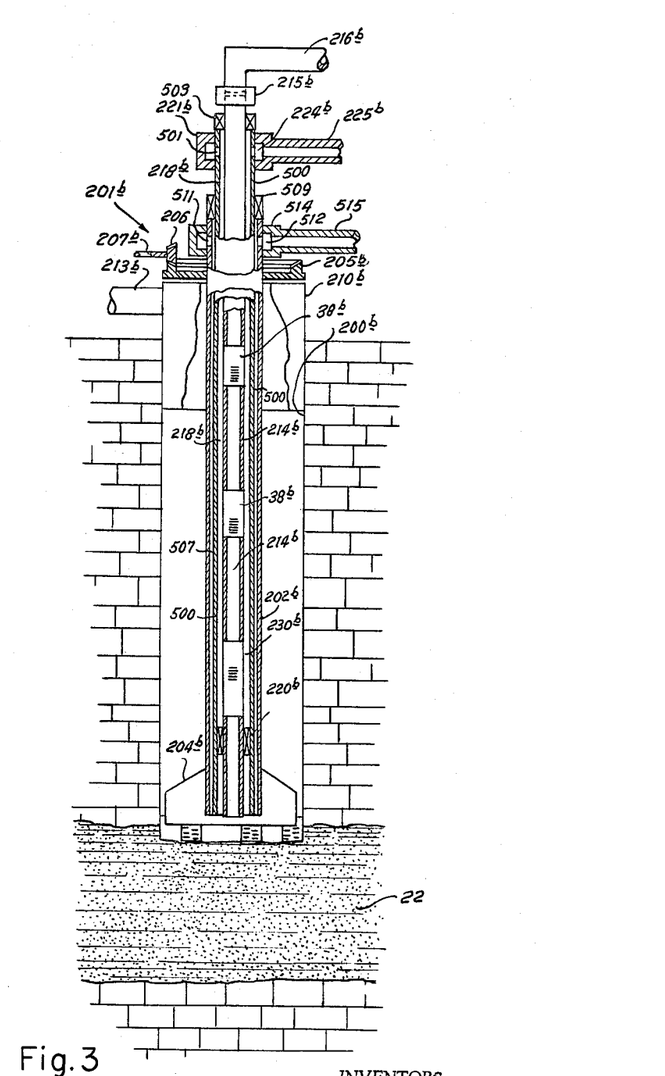
FIGURE 3 is a schematic illustration of still another drilling apparatus including a transportation system of the invention.

Referring now to FIGURE 3 of the drawing, the apparatus 201b for drilling a well bore 200b illustrated in FIGURE 3 is similar to the apparatus 201 illustrated in FIGURE 2, and accordingly the elements of the apparatus 201b have been provided with the same reference numerals, to which the subscript b has been added, as the corresponding elements of the apparatus 200. The apparatus includes an intermediate string of tubing 500 disposed between the tubing 214b and the drill pipe 202b.

The flow control device 230b and one or more ejector pumps 38b are connected in the inner tubing 214. The intermediate tubing provides the annular gas passage 218b into which the high pressure gas is introduced through the inlet conduit 225b and the manifold 221b whose annular passage 224b communicates with ports 501 in the upper end portion of the intermediate tubing. A suitable seal means 503 between the tubing 241b and the intermediate tubing closes the upper end of the gas passage and a packer 220b closes the lower end thereof. The intermediate tubing and the drill pipe 202b provide an annular outer passage 507 which opens downwardly to the well bore. The upper end of the outer passage is closed by the suitable seal means 509 which seals between the drill pipe and the intermediate pipe. The drill pipe has a plurality of lateral ports 511 which open into the annular passage 512 of a manifold 514 in which the drill pipe is rotatable. An outlet conduit 515 is connected to the drill pipe manifold. The inner and outer tubings 214b and 500 and the drill pipe are rigidly secured to one another and rotatable as a unit by the usual drive means which may include a gear 205b through which the drill pipe is movable longitudinally but non-rotatably.

In the operation of the apparatus 201b illustrated in FIGURE 3, the low pressure gas introduced into the upper end of the well bore 200a through the inlet conduit 213b and the casing head 210b flows downwardly to the bottom of the well bore and then flows upwardly through the annular outer passage 507 with an increased velocity since the effective orifice of the outer passage is of course considerably smaller than the annulus of the well bore 200b about the drill pipe. The outlet conduit 225b is now closed by a suitable valve. The cuttings and any water which flows into the well bore at a relatively low rate are thus transported to the surface through passage 507, the drill pipe manifold 514 and the outlet conduit 515. In the event that the rate of drilling is so great that this circulation of the low pressure gas is not effective to transport the cuttings and water to the surface as for example, when the well bore extends into and through a water bearing formation 22, gas under a high pressure, for example, 600 p.s.i., is introduced into the gas passage 218 through the manifold 221b to successively open the ejector pumps 38 and the water and the cuttings are then transported to the surface through the tubing 214b, the manifold 215b and the outlet conduit 216b.

The conduit 515 may be closed, if desired, during the operation of the ejector pumps by a suitable valve. Alternatively, the flow of gas through the outer passage may be continued during the operation of the ejector pumps.

In the event that during any interruption of the operation of the drilling apparatus, water accumulates in the well bore to a level above the flow control device 230b, low pressure gas is introduced into the well bore and the high pressure gas is introduced into the flow passage 218b after the conduit 515 has been closed by a suitable valve. After the ejector pumps 38b have successively opened, a further increase in the pressure in the gas passage 218b causes the ball valve of the flow control device 230b to close whereupon the compressed air under pressure introduced through the flow control device 230b into the tubing is effective to move the column or slug of water thereabove to the surface. After the column of water has been removed from the tubing 215b, the pressure in the gas passage is reduced to a value at which the ball valve moves back to its open position but at which the ejector pumps 38b are still in operation and are then effective to transport water from the well bore to the surface through the inner tubing 214b.

If the amount of water in the well bore is so great that the first operation of the flow control device 230b does not result in the removal of a sufficient amount of water from the well bore to permit removal of the remaining water by the action of the ejector pumps, the above sequence of operation of the flow control devices may be repeated as many times as necessary until the ejector pumps in conjunction with the circulation of the low pressure gas are effective to remove any remaining water from the well and the drilling operation can again be started. The cuttings and water may thereafter be transported through either the inner tubing or the outer passage 507 or through both during the drilling of the well bore.

It will now be apparent that the method of transporting fluids such as cuttings and water to the surface from a well bore during the drilling thereof, using any one of the transportation apparatus illustrated in FIGURES 1, 2 and 3 of the drawings, includes positioning a flow conductor or tubing with its lower end open to the bottom of the well bore injecting a gas at a high velocity in an upward direction into the flow conductor at a location above the lower end of the tubing to decrease the pressure in the tubing immediately below such location.

It will further be seen that in the event that liquid is present in the longitudinal passage of the tubing to a height above the location of introduction of the high velocity gas into the tubing, the method includes closing the longitudinal passage of the tubing below the location, as by the check valve 34 illustrated in FIGURE 1 or by the flow control devices 230 and 230b illustrated in FIGURES 2 and 3, upon the initiation of introduction of high velocity gas into the tubing at such location and then opening the longitudinal passage when the column or slug of water has been transported to the surface.

It will further be seen that a new and improved drilling and transportaion apparatus has been illustrated in FIGURES 2 and 3 which includes a drill pipe provided at its lower end with a drill bit means such as the tubing 214 and 214b through the drill pipe providing a longitudinal passage through which cuttings and liquids are transportable from the well bore and an annular passage, such as the gas passage 218 and 218b, through which gas under high pressure from the surface may be transmitted to operate flow control devices such as ejector pumps 38 and the control devices 230 and 230b connected in the tubing and each responsive to the pressure of the gas when in the gas passage when it increases to a predetermine value to permit flow of the gas at high velocity into the tubing to aid in transporting the cuttings and liquid to the surface.

It will further be seen that the drilling and transportation apparatus includes connector means for connecting the drill pipe and such tubing at the surface for non-rotatable movement relative to one another and rotatable movement relative to the manifolds 221 or 221b through which the high pressure gas is introducible into such gas passage.

It will further be seen that the assembly of the drill pipe 202 and the tubing 214, in the case of the apparatus 201 of FIGURE 2, the tubings 214b and 500 in the case of the apparatus 201b illustrated in FIGURE 3, extends longitudinally movably into the usual casing head and is rotatable by a suitable drive means, that low pressure gas is introducible into the well bore to flow downwardly therein through the annulus about the drill pipe and upwardly through the tubing 214 in the case of the apparatus 214a and the annular passage 507 in the case of the apparatus 201b, to transport to the surface cuttings of earth formation being produced at a normal rate during the drilling and any liquids flowing into the well and that the injection of the high pressure gas through the various flow control devices connected in the tubing accelerates the rate of such transport of the cuttings and water through the longitudinal passage of the tubing when the rate of production of cuttings or the rate of flow of liquids into the well bore exceeds the capacity of the circulating low pressure gas.

It will also be seen that the transportation apparatus includes a new and improved flow control device 38 having a mandrel 40 connectable in the tubing or flow conductor to constitute a section thereof and having a longitudinal passage or bore 106 which is of substantially the same internal diameter as the internal diameter of the tubing and also having a plurality of circumferentially spaced upwardly and inwardly convergent and gas inlet flow passages and a valve means which includes a tubular valve member 73 biased towards closed position by a charge of gas in a charge chamber 71 to control flow of gas from the exterior of the flow control device through the inlet gas passages whereby the flow control device 38 is rendered operative to permit flow of high pressure gas into the passage of the mandrel only when the pressure exteriorly of the flow conductor device exceeds the pressure in the charge chamber 71.

It will further be seen that the large annular passage 72 of the flow control and the provision of a plurality of circumferentially spaced inlet flow passages permits for the introduction of relatively great rate of flow of the high velocity gas into the tubing to decrease the pressure below the location of the entrance of the passage into the mandrel without obstructing or restricting the passage 106.

It will further be seen that the velocity of flow of the fluids moving through the passage 106 downstream of the inlet passages is further increased by a restriction of the passage 106 as by the restricting member 110.

It will further be seen that the inlet flow passages 102 are flared in the direction inwardly to permit expansion of the gas as it flows therethrough and increase the cross-sectional dimensions of the jets of the high pressure gas at the locations of their entrance into the mandrel and thus increase the efficiency of operation of the flow control device.

It will further be seen that the flow control device 230, like the flow control device 38, has a mandrel provided with circumferentially spaced inwardly and upwardly convergently opening flow passages 302 through which gas at high velocity is introducible into the mandrel and a valve means which includes the tubular resilient valve member 270 but in addition has a valve for controlling flow of the high pressure gas into the mandrel, which closes to prevent flow of fluids through the mandrel and the flow control device when the valve member 270 is in open position.

It will further be seen that the flow control device 230 has means biasing its valve assembly towards its open position and that the passage of the ball valve 326 is substantially equal in diameter to the passage of the mandrel 250 and of the tubing or flow conductor in which the flow control device is connectable so that the connection of the flow control device 230 in the flow conductor does not appreciably restrict the effective orifice and thus the transport capacity of the passage of such flow conductor.

It will further be seen that the port ring 312 and the bottom and top tubular seat members 325 and 327 of the flow control device 230 may be regarded as continuations or sections of its mandrel 150 and the valve housing 320 as a continuation or section of its sleeve 321 so that the piston can be regarded as being located in the annular space between the sleeve and the mandrel and the passages of the seat members and the port ring as portions of the longitudinal flow passage of the mandrel.

It will now also be apparent that while the high pressure is supplied to the flow control devices of the transportation apparatus illustrated in FIGURES 1, 2 and 3 through an annular gas passage provided by an outer flow conductor such as the casing 24 of the apparatus 25 of FIGURE 1 through which the flow conductor 27 extends, the drill pipe 202 of the apparatus 201 of FIGURE 2 through which the flow conductor 214 extends or the drill pipe 202b and the intermediate tubing 500 of the apparatus 201b of FIGURE 2, other suitable means may be provided for introducing or providing high pressure gas to such flow control devices. For example, a separate manifold could be provided about each of the flow control devices to which gas from a suitable separate source or a common source could be supplied by suitable conduits.

It will further be seen that while the transportation apparatus has been described as used in removing fluids from a well bore, that the transportation apparatus may be used to transport any fluids, such as cement, grain or other granular materials, liquids or gases from one location to another through a conduit whether the conduit extends horizontally or vertically.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A transportation apparatus including: a conduit having means providing a longitudinal central passage through which fluids are transportable and means providing a gas passage in said conduit externally of said longitudinal central passage; a plurality of flow control valve and check valve devices connected in said conduit at longitudinally spaced locations therealong, each of said flow control and check valve devices comprising a tubular mandrel constituting a section of the conduit and having a plurality of circumferentially spaced flow passages communicating the gas passage of the conduit to the central passage of said mandrel through said flow passages, said flow passages directing the flow of gas from the gas passage into the central passage in the direction of longitudinal movement of the fluids being transported through said central passage; and means for closing said longitudinal passage at a location upstream of the said flow control devices, said passage closing means comprising a check valve responsive to gas pressure in said gas passage to prevent reversal of flow through said longitudinal central passage, at least one of said mandrels having means immediately downstream of the locations of the communication of its flow passages with the central passage of said one mandrel restricting the orifice of said longitudinal central passage to increase the velocity of longitudinal flow of fluids.

2. A transportation apparatus including: a conduit having means providing a longitudinal central passage through which fluids are transportable and having means providing a gas passage therein exteriorly of said central passage and separate therefrom; a plurality of flow control valve and check valve devices connected in said conduit at longitudinally spaced locations therealong, each of said flow control and check valve devices comprising a tubular mandrel constituting a section of the conduit and having a plurality of circumferentially spaced flow passages communicating the gas passage of the conduit to the interior of the longitudinal central passage through said flow passages, said flow passages directing the flow of gas from the gas passage into the interior of the mandrel in the direction of longitudinal movement of the fluids being transported through said longitudinal central passage; and means for closing said longitudinal central passage at a location upstream of the said flow control devices, said passage closing means comprising a check valve responsive to gas pressure from the gas passage in the conduit to prevent reversal of flow through said longitudinal central passage, said flow control valve means of each flow control device opening at a lower pressure of the gas exteriorly of the mandrel than the flow control valve means of the flow control device located relative thereto upstream of the longitudinal flow of fluids through said longitudinal central passage.

3. A transportation apparatus including: a conduit having means providing a longitudinal central passage through which fluids are transportable and having a gas passage formed therein externally of said longitudinal central passage and separate therefrom; a plurality of flow control valve and check valve devices connected in said conduit at longitudinally spaced locations therealong, each of said flow control and check valve devices comprising a tubular mandrel constituting a section of the conduit and having a plurality of circumferentially spaced flow passages communicating the gas passage of the conduit to the interior of said mandrel and the longitudinal central passage through said flow passages, said flow passages directing the flow of gas from the gas passage into the central passage of the mandrel in the direction of longitudinal movement of the fluids being transported through said longitudinal central passage; and means for closing said longitudinal central passage at a location upstream of the said flow control devices, said passage closing means comprising a check valve responsive to fluid pressure in the gas passage of the conduit to prevent reversal of flow through said longitudinal central passage, at least one of said mandrels having means immediately downstream of the locations of the communiaction of its flow passages with the central passage of said one mandrel restricting the orifice of said longitudinal central passage to increase the velocity of longitudinal flow of fluids, said flow control valve means of each flow control device opening at a lower pressure of the gas from said gas passage of said conduit than the flow control valve means of the flow control device located relative thereto upstream of the longitudinal flow of fluids through said longitudinal central passage.

4. A transportation apparatus including: a conduit having means providing a longitudinal central passage through which fluids are transportable and having a gas passage formed therein externally of said longitudinal central passage and separate therefrom; and a plurality of flow control devices connected in said conduit at longitudinally spaced locations therealong, each of said flow control devices comprising a tubular mandrel constituting a section of the conduit and having a plurality of circumferentially spaced flow passages communicating the gas passage of the conduit with the longitudinal central passage through the mandrel, and valve means for controlling admittance of gas from the gas passage of the conduit to the central passage of the conduit through said flow passages, said flow passages directing the flow of gas from the gas passage into the interior of the mandrel in the direction of longitudinal central movement of the fluids being transported through said longitudinal passage, said valve means of each flow control device opening at a lower pressure of the gas exteriorly of the mandrel than the valve means of the flow control device located relative thereto upstream of the longitudinal flow of fluids through such longitudinal central passage, the flow control device located upstream of all others of said flow control devices including a second valve means operable in response to fluid pressure in said gas passage of said conduit to close said longitudinal central passage when its said first mentioned valve means is open.

5. A transportation apparatus for a drilling apparatus for drilling a large diameter well bore comprising a rotatable drill pipe having a drill bit on its lower end, means closing the upper end of the well bore through which the drill pipe extends movably; and means for introducing gas under low pressure into the well bore; said transportation apparatus including: a tubing extending longitudinally through said drill pipe and spaced therefrom to provide an annular passage therebetween, said tubing having a longitudinal passage opening at its bottom end to the large well bore adjacent the drill bit and opening at its upper end to the surface; said longitudinal passage being of substantially smaller orifice than the annular passage of the well bore about the drill pipe whereby air introduced at a low pressure into the well bore exteriorly of the drill pipe at the surface flows downwardly to the bottom of the well bore and then upwardly at an increased velocity through said longitudinal passage of said tubing to transport cuttings of earth formations being penetrated by said drill bit to the surface; means closing the upper and lower ends of said annular passage to provide a high pressure annular gas passage between said tubing and said drill pipe; and means for introducing gas under relatively high pressure into the upper end of said gas passage, said tubing having at least one flow control device connected thereto for introducing gas from said gas passage into said longitudinal passage and directing the flow of the gas upwardly into said longitudinal passage to increase the velocity of upward flow of fluids through said longitudinal passage.

6. A transportation apparatus for a drilling apparatus for drilling a large diameter well bore comprising a rotatable drill pipe having a drill bit on its lower end, means closing the upper end of the well bore through which the drill pipe extends movably; and means for introducing gas under low pressure into the well bore; said transportation apparatus including: a tubing extending longitudinally through said drill pipe and spaced therefrom to provide an annular passage therebetween, said tubing having a longitudinal passage opening at its bottom end to the large well bore adjacent the drill bit and opening at its upper end to the surface; said longitudinal passage being of substantially smaller orifice than the annular passage of the well bore about the drill pipe whereby air introduced at a low pressure into the well bore exteriorly of the drill pipe at the surface flows downwardly to the bottom of the well bore and then upwardly at an increased velocity through said longitudinal passage of said tubing to transport cuttings of earth formations being penetrated by said drill bit to the surface; means closing the lower end of said annular passage to provide an annular high pressure gas passage between said tubing and said drill pipe; means non-rotatably connecting said drill pipe and said tubing and closing the upper end of said annular gas passage; said connecting means including means for introducing gas under pressure into the upper end of said gas passage, said tubing having at least one flow control device connected thereto for introducing gas from said gas passage into said longitudinal passage and directing the flow of the gas upwardly into said longitudinal passage to increase the velocity of upward movement of fluids through said longitudinal passage.

7. A transportation apparatus for a drilling apparatus for drilling a large diameter well bore comprising a rotatable drill pipe having a drill bit on its lower end, means closing the upper end of the well bore through which the drill pipe extends movably; and means for introducing gas under low pressure into the well bore; said transportation apparatus including: a tubing extending longitudinally through said drill pipe and spaced therefrom to provide an annular passage therebetween, said tubing having a longitudinal passage opening at its bottom end to the large well bore adjacent the drill bit and opening at its upper end to the surface; said longitudinal passage being of substantially smaller orifice than the annular passage of the well bore about the drill pipe whereby gas introduced at a low pressure into the well bore at the surface flows downwardly to the bottom of the well bore and then upwardly at an increased velocity through said longitudinal passage to transport cuttings of earth formations being penetrated by said drill bit to the surface; means closing the upper and lower ends of said annular gas passage; and a flow control device, said control device comprising a tubular mandrel connected in said tubing and constituting a section thereof, said mandrel having a plurality of circumferentially spaced flow passages through which gas under pressure is introduceable into said longitudinal passage for upward convergent flow, and valve means for controlling flow of gas from said gas passage through said flow passages, said valve being open when the pressure in said gas passage exceeds a predetermined value.

8. The apparatus of claim 7 wherein said flow control device includes a second valve means responsive to the pressure in said gas passage when said first mentioned valve means is open for closing said longitudinal passage below said flow passages.

9. The apparatus of claim 7 wherein said flow control device includes a second valve means responsive to the pressure in said gas passage when said first mentioned valve means is open for closing said longitudinal passage below said flow passages; and a second flow control device connected in said tubing above said flow control device having a second valve means and responsive to the pressure of the gas in said gas passage for introducing gas from said gas passage into said longitudinal passage and directing the flow of gas upwardly into said longitudinal passage when the pressure in said gas passage exceeds a value lower than the value thereof at which said valve means of said first mentioned flow control device opens.

10. A method of transporting fluids from a well bore including: positioning in the well bore conduit means having an outer annular passage and an inner longitudinal passage open to the well bore at its lower end adjacent the bottom of the well bore and its upper end to the surface; introducing gas at low pressure into the well bore exteriorly of said conduit means at the well surface for downward flow in said well bore from the surface about said conduit means to the lower end of the well bore and then upwardly through the inner longitudinal passage; and introducing gas under high pressure at the surface into the annular passage and thence into said longitudinal passage intermediate the ends of the longitudinal passage at a high velocity and in an upward direction to decrease the pressure in the passage below the pressure at the location of entry of the gas into the passage.

11. A method of transporting fluids from a well bore including: positioning in the well bore conduit means having an annular passage and an inner longitudinal passage open to the well bore at its lower end adjacent the bottom of the well bore and its upper end to the surface; introducing gas at low pressure into the well bore exteriorly of said conduit means for downward flow therethrough about said conduit means to the lower end of the well bore and then upwardly through the longitudinal passage; and introducing gas under high pressure at the surface into the annular passage and thence into said longitudinal passage intermediate the ends of the longitudinal passage at a high velocity and in an upward direction to decrease the pressure in the passage below the location of entry of the high velocity gas into the passage; and closing the longitudinal passage below the location of entry of the high velocity gas into the passage when a column of liquids is present in the longitudinal passage above the location of entry of high velocity gas into the passage.

12. A method of transporting fluids from a well bore including: positioning a conduit means having an inner longitudinal passage and an annular passage about the longitudinal passage with the lower end of the longitudinal passage opening at its lower end to the well bore adjacent its bottom and at its upper end to the surface, and introducing gas under pressure into the annular passage at its upper end and thence into the longitudinal passage in upward directions at successively lower locations as the pressure in the gas passage increases; and closing the longitudinal passage adjacent its lower end in response to fluid pressure in said annular passage when a column of liquids is present in the longitudinal passage above a location of entry of the gas of high velocity into the longitudinal passage.

13. A flow control device including: a mandrel having a longitudinal flow passage and connectable in a flow conductor to constitute a section thereof, said mandrel having a plurality of circumferentially spaced inwardly convergent flow passages extending at an angle in one direction relative to the longitudinal axis of the longitudinal passage and terminating at the longitudinal flow passage of said mandrel, said mandrel having means restricting the orifice of said longitudinal flow passage adjacent in said one direction the inner ends of said passages; said restriction providing an annular surface extending inwardly and then outwardly in said direction to minimize turbulence of fluids flowing through said restriction; valve means carried by said mandrel for controlling flow of fluids from the exterior of the flow control device into said longitudinal flow passage through said inlet flow passages, said valve means being responsive to the pressure exteriorly of said flow control device and opening when the pressure exteriorly of the flow control device exceeds a predetermined value; and second valve means for closing said longitudinal flow passage at a location spaced from said inlet passages in a second longitudinal direction opposite said one direction, said second valve means having means responsive to pressure of fluids exteriorly of the flow control device for moving said second valve means to closed position by pressure from exteriorly of the flow control device when said first mentioned valve means is open.

14. A flow control device including: a mandrel having a longitudinal flow passage and connectable in a flow conductor to constitute a section thereof, said mandrel having a plurality of circumferentially spaced inwardly convergent flow passages extending at an angle in one direction relative to the longitudinal axis of the longitudinal passage and terminating at the longitudinal flow passage of said mandrel, said mandrel having means restricting the orifice of said longitudinal flow passage adjacent in said one direction the inner ends of said passages; said restriction providing an annular surface extending inwardly and then outwardly in said direction to minimize turbulence of fluids flowing through said restriction; valve means carried by said mandrel for controlling flow of fluids from the exterior of the flow control device into said longitudinal flow passage through said inlet flow passages, said valve means being responsive to the pressure exteriorly of said flow control device and opening when the pressure exteriorly of the flow control device exceeds a predetermined value; and second valve means for closing said longitudinal flow passage at a location spaced from said inlet passages in a second longitudinal direction opposite said one direction, said second valve means being moved to closed position by pressure of fluids passing through said flow passages of said mandrel from exteriorly of the flow control device when said first mentioned valve means is open, said second valve means including a movable valve member and means operatively connected to said valve member and exposed to and movable by the pressure of fluids passing through said flow passages of said mandrel from the exterior of said flow control device for moving said valve member to a closed position when said first valve means is open.

15. A flow control device including: a mandrel having a longitudinal flow passage and connectable in a flow conductor to constitute a section thereof, said mandrel having a plurality of circumferentially spaced inwardly convergent flow passages extending at an angle in one direction relative to the longitudinal axis of the longitudinal passage and terminating at the longitudinal flow passage of said mandrel; valve means including a sleeve carried by said mandrel and providing an annular flow passage therethrough, a valve member in said annular space dividing said space into a pressure charge chamber and an annular flow passage, said sleeve having lateral ports opening to said flow passage and closable by said valve member when said valve member is in closed position, said inlet flow passages of said mandrel opening to said flow passage, said valve member being movable to open position to permit flow of fluids from the exterior of said sleeve through said lateral ports into said annular flow passage and thence through said inlet flow passages into said longitudinal passage of said mandrel when the pressure exteriorly of said flow control device exceeds the pressure in said charge chamber; and second valve means for closing said longitudinal flow passage at a location spaced from the inner ends of said flow passages in a second longitudinal opposite said one direction, said second valve means including a movable member and operator means operatively associated with said movable member disposed in said space and movable therein by pressure in said annular flow passage when said first valve means is open to move said movable member to position closing said longitudinal flow passage.

16. A flow control device including: a mandrel having a longitudinal flow passage and connectable in a flow conductor to constitute a section thereof, said mandrel having a plurality of circumferentially spaced inwardly convergent flow passages extending at an angle in one direction relative to the longitudinal axis of the longitudinal passage; valve means including a sleeve carried by said mandrel and providing an annular space thereabout, a valve member in said annular space dividing said space into a pressure charge chamber and a flow passage, said sleeve having lateral ports opening to said flow passage and closable by said valve member when said valve member is in closed position, said inlet flow passages of said mandrel opening to said flow passage, said valve member being movable to open position to permit flow of fluids from the exterior of said sleeve through said lateral ports into said annular flow passage and thence through said inlet flow passages into said longitudinal passage of said mandrel when the pressure exteriorly of said flow control device exceeds the pressure in said charge chamber; second valve means for closing said longitudinal flow passage at a location spaced from the inner ends of said flow passages in a longitudinal direction opposite said one direction, said second valve means including a movable member and operator means operatively associated with said movable member disposed in said space and movable therein by pressure in said annular flow passage when said first valve means is open to move said movable member to position closing said longitudinal flow passage, and means operatively associated with said operator means biasing said movable member to position opening said longitudinal passage.

17. A flow control device including: a mandrel having a longitudinal flow passage and connectable in a flow conductor to constitute a section thereof, said mandrel having a plurality of circumferentially spaced inwardly convergent flow passages extending at an angle in one direction relative to the longitudinal axis of the longitudinal passage; valve means including a sleeve carried by said mandrel and providing an annular space thereabout, a valve member in said annular space dividing said space into pressure charge chamber and a flow passage, said sleeve having lateral ports opening to said flow passage and closable by said valve member when said valve member is in closed position, said inlet flow passages of said mandrel opening to said flow passage, said valve member being movable to open position to permit flow of fluids from the exterior of said sleeve through said lateral ports itno said annular flow passage and thence through said inlet flow passages into said longitudinal passage of said mandrel when the pressure exteriorly of said flow control device exceeds the pressure in said charge chamber; second valve means for closing said longitudinal flow passage at a location spaced from the inner ends of said flow passages in a longitudinal direction opposite said one direction, said second valve means including a movable member movable between open and closed positions, an annular piston longitudinally movable in said annular space and exposed to the pressure in said annular flow passage; and means connecting said piston to said movable member for moving said movable member from open to closed position when said first valve means is open and said piston is moved in one direction relative to said mandrel and said sleeve.

18. A flow control device including: a mandrel having a longitudinal flow passage and connectable in a flow conductor to constitute a section thereof, said mandrel having a plurality of circumferentially spaced inwardly convergent flow passages extending at an angle in one direction relative to the longitudinal axis of the longitudinal passage; valve means including a sleeve carried by said mandrel and providing an annular space thereabout, a valve member in said annular space dividing said space into a pressure charge chamber and a flow passage, said sleeve having lateral ports opening to said flow passage and closable by said valve member when said valve member is in closed position, said inlet flow passages of said mandrel opening to said flow passage, said valve member being movable to open position to permit flow of fluids from the exterior of said sleeve through said lateral ports into said annular flow passage and thence through said inlet flow passages into said longitudinal passage of said mandrel when the pressure exteriorly of said flow control device exceeds the pressure in said charge chamber; second valve means for closing said longitudinal flow passage at a location spaced from the inner ends of said flow passages in a longitudinal direction opposite said one direction, said second valve means including a movable member movable between open and closed positions, an annular piston longitudinally movable in said annular space and exposed to the pressure in said annular flow passage; means connecting said piston to said movable member for moving said movable member from open to closed position when said first valve means is open and said piston is moved in one direction relative to said mandrel and said sleeve; and means biasing said piston for movement in a direction opposite said one direction.

19. A flow control device including: a mandrel having a longitudinal flow passage and connectable in a flow conductor to constitute a section thereof, said mandrel having a plurality of circumferentially spaced inwardly convergent flow passages extending at an angle in one direction relative to the longitudinal axis of the longitudinal passage; valve means including a sleeve carried by said mandrel and providing an annular space thereabout, a valve member in said annular space dividing said space into a pressure charge chamber and a flow passage, said sleeve having lateral ports opening to said flow passage and closable by said valve member when said valve member is in closed position, said inlet flow passages of said mandrel opening to said flow passage, said valve member being movable to open position to permit flow of fluids from the exterior of said sleeve through said lateral ports into said annular flow passage and thence through said inlet flow passages into said longitudinal passage of said mandrel when the pressure exteriorly of said flow control device exceeds the pressure in said charge chamber; second valve means for closing said longitudinal flow passage at a location spaced from the inner ends of said flow passages in a longitudinal direction opposite said one direction, said second valve means including a ball having an axial passage and rotatable between an open position wherein the axial passage is in alignment and communication with said longitudinal passage and a closed position wherein said axial passage is out of alignment and communication with said longitudinal flow passage, and operator means responsive to the pressure in said annular flow passage and engageable with said ball for rotating said ball between its open and closed positions.

20. The flow control device of claim 19 wherein said operator means comprises an annular piston in said annular space movable in one longitudinal direction therein by the pressure from the exterior of the flow control device to rotate the ball to closed position when said first valve means is open, and means biasing said piston for movement in said annular space in a longitudinal direction opposite said one longitudinal direction.

References Cited

UNITED STATES PATENTS

| | | | |
|---|---|---|---|
| 3,289,609 | 12/1966 | Palo | 103—233 X |
| 3,195,661 | 7/1965 | Jackson et al. | 175—205 X |
| 3,208,537 | 9/1965 | Scarborough | 175—61 X |
| 1,071,199 | 8/1913 | Andrews | 175—205 |
| 1,140,982 | 7/1915 | Huff | 103—233 X |
| 1,547,194 | 7/1925 | Arbon | 103—261 |
| 1,585,969 | 5/1926 | Ferguson | 175—217 X |
| 2,305,250 | 12/1942 | Garrett et al. | 103—233 |
| 2,599,713 | 6/1952 | Kagay et al. | 137—155 X |
| 2,680,408 | 6/1954 | Davis | 103—233 X |
| 2,875,775 | 3/1959 | Cummings | 103—23 X |
| 2,894,715 | 7/1959 | Bostock | 166—224 X |
| 3,063,755 | 11/1962 | Wildereld et al. | 302—58 |
| 3,075,589 | 1/1963 | Grable et al. | 175—218 X |

FOREIGN PATENTS

| | | |
|---|---|---|
| 1,184,990 | 2/1959 | France. |
| 1,222,382 | 1/1960 | France. |

CHARLES E. O'CONNELL, *Primary Examiner.*

I. A. CALVERT, *Assistant Examiner.*